United States Patent
Parker

(10) Patent No.: US 6,503,428 B1
(45) Date of Patent: Jan. 7, 2003

(54) PROCESS FOR MANUFACTURING FLOOR AND WALL COVERINGS AND PRODUCT THEREOF

(76) Inventor: Steven C. Parker, 895 Fruitland Dr., Deltona, FL (US) 32725

(*) Notice: Subject to any disclaimer, the term of this patent is extended or adjusted under 35 U.S.C. 154(b) by 0 days.

(21) Appl. No.: 09/536,100

(22) Filed: Mar. 24, 2000

(51) Int. Cl.⁷ .................. B29C 39/10; B29C 39/12; B29C 67/24; B29C 70/64; B29C 70/82

(52) U.S. Cl. .................. 264/71; 264/236; 264/256; 264/273; 264/274; 264/279.1; 264/279.9; 264/308; 264/347

(58) Field of Search .................. 264/71, 72, 102, 264/236, 347, 255, 256, 273, 274, 279, 279.1, 308, 297.8, 297.9

(56) References Cited

U.S. PATENT DOCUMENTS

| | | | |
|---|---|---|---|
| 1,596,482 A | * 8/1926 | Ewen | 264/256 |
| 3,344,011 A | * 9/1967 | Goozner | 156/242 |
| 3,512,460 A | * 5/1970 | Surine et al. | |
| 3,753,849 A | * 8/1973 | Duff | 428/414 |
| 3,836,619 A | 9/1974 | Volent | 264/131 |
| 4,292,268 A | 9/1981 | Salensky | 264/236 |
| 4,313,900 A | 2/1982 | Gonzales, Jr. et al. | 264/61 |
| 4,434,119 A | 2/1984 | Teare | 264/145 |
| 4,644,719 A | 2/1987 | Salazar | 52/311 |
| 5,047,187 A | * 9/1991 | Banus | 156/63 |
| 5,362,322 A | 11/1994 | Johansen, Jr. et al. | 106/802 |
| 5,372,676 A | 12/1994 | Lowe | 156/654 |
| 5,424,020 A | 6/1995 | Hara et al. | 264/257 |
| 5,431,730 A | 7/1995 | Fujimasu | 106/694 |
| 6,054,088 A | * 4/2000 | Alhamad | 264/256 |

FOREIGN PATENT DOCUMENTS

| | | | | |
|---|---|---|---|---|
| GB | 1187267 | * | 4/1970 | C08G/45/00 |
| GB | 1310673 | * | 3/1973 | B29C/5/00 |

* cited by examiner

Primary Examiner—Jan H. Silbaugh
Assistant Examiner—Michael I. Poe
(74) Attorney, Agent, or Firm—Patent Focus, Inc.; Richard G. McComas

(57) ABSTRACT

A process for manufacturing floor and wall coverings that produces a product a user may adhere to any wall or floor surface. The process begins by blending selected volumes of epoxy and aggregate into a vessel. A selected portion of the blended mixture is poured into a mold of selected geometry. A first piece of interlocking screening material is positioned over the first selected portion of the blended mixture. A second selected portion of the blended mixture is poured over the first interlocking screening material. A second piece of interlocking screening material is positioned over the second selected portion of the blended mixture. A selected portion of an adhering material is embedded into the top surface of the second interlocking screening material and the second selected portion of the blended molded mixture. The mold is cured and the product is released from the mold.

16 Claims, 3 Drawing Sheets

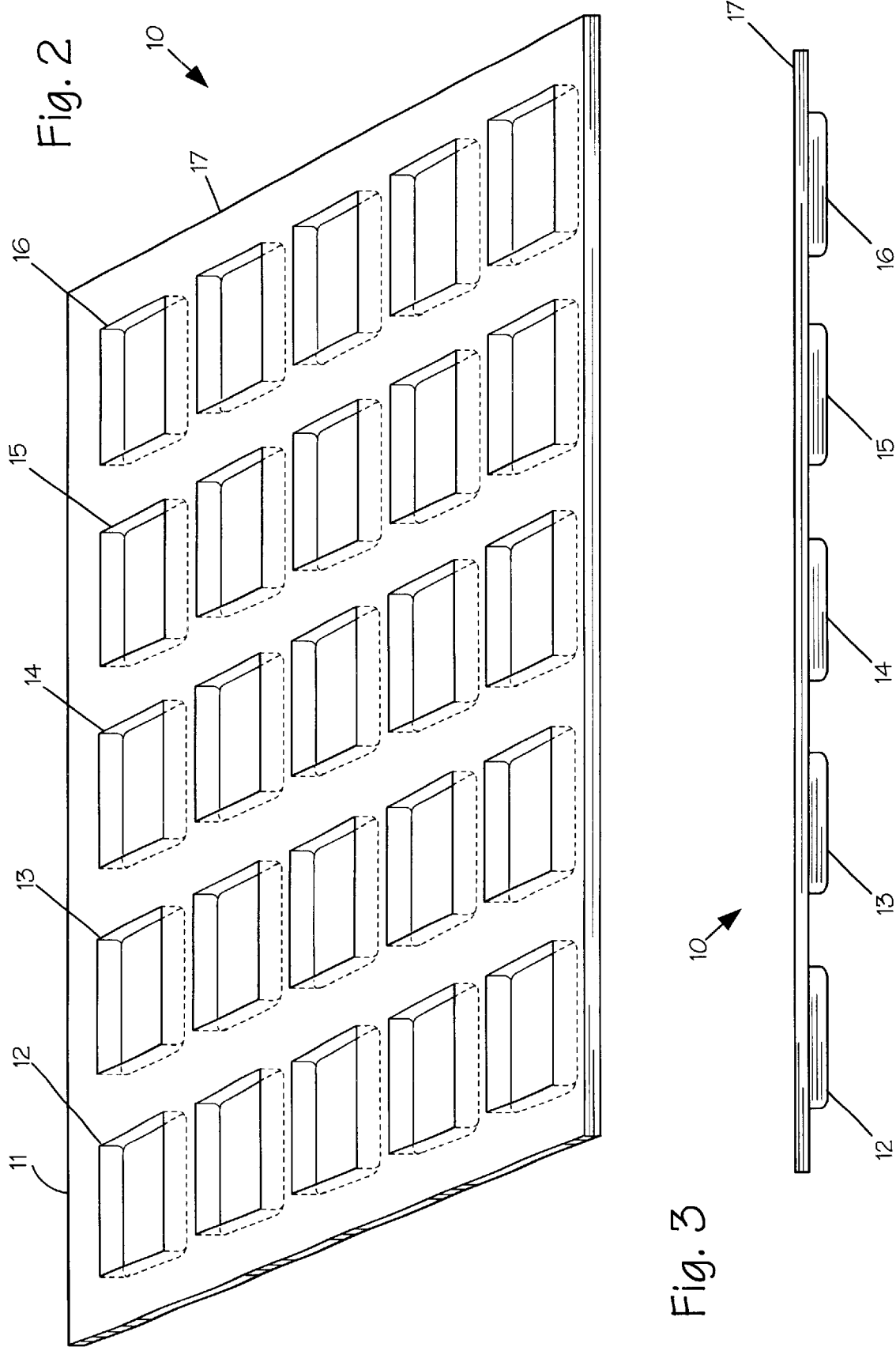

PROCESS FOR MANUFACTURING FLOOR AND WALL COVERINGS AND PRODUCT THEREOF

BACKGROUND OF THE INVENTION

The manufacture of floor and wall coverings has changed and matured over the years. Historically, once a building, home, or room is constructed some type of floor or wall covering is adhered to the surface of the floors or walls. The adhering process may involve glue, nails, or another method of affixing the floor or wall coverings to the structure of the building, home, or room. The materials and their textures that are used in floor and wall coverings have also changed over the years. Primarily, the advancements in material science, consumer tastes, and the desires and needs of the owners or occupants of the structure influence the selection of floor and wall coverings. Some of the manufactured floor and wall coverings have been produced to resemble brick, tiles, and other aesthetically pleasing surfaces. Generally, floor and wall coverings are manufactured in large sheets or pre-mixed as liquids to be poured at the job site. The surface texture of the sheets or poured liquid is then finished as desired.

Typically, when floor and wall coverings are manufactured as large sheets, the manufacture does not provide reinforcements to support the weight of the large sheets. The weight of the sheet versus the overall size of the sheet causes the manufacturer to limit the overall size of the sheet to a proportion that will support the weight without additional reinforcements. This phenomenon also limits the texture and the possibly of producing aesthetically pleasing surfaces. The floor and wall covering sheets must be reduced in size or they must be reinforced by structural means. If the sheets are reduced in size the economies of scale suffer.

Generally, if floor coverings are premixed as a liquid and poured at the job site a substantial amount of curing time is required. The curing time results in the job site being closed during this period. If the job site is not closed, damage may occur to the freshly poured floor causing re-pouring or refinishing of the floor. Pouring floor coverings is time consuming and costly with marginal results.

If a premixed liquid is used to apply a wall covering, the consistency of the mix must be thinned in order to spray or otherwise apply it to a wall structure. This process limits the texture, composition, and availability of materials that can be used in wall coverings. If the surface of the wall covering is textured or has additional material added to it the weight and reinforcement problems limit the type of materials that can be adhered to the wall covering.

In the past attempts been made to overcome the problems associated with manufacturing a variety of floor and wall coverings that may, if desired, be readily adhered to any surface. One such attempt used artificial stone that was hollow in the center to reduce the overall weight of the material. If the center portion of the material is hollow, a backing plate of some type must be installed to the back portion of the material to allow the attachment to a structural surface. Another attempt involved using mortar and a variety of color pigments. Again, the weight problem and limitation of materials prevented this attempt from functioning as desired.

It would be desirable to have a product that is suitable for both floors and walls. The product would be of such a weight and size it could be easily adhered to a wall surface. The product would not require pouring at the job site or an extended curing time. The process of producing the product would allow it to be produced in large quantities from a variety of materials.

SUMMARY OF THE INVENTION

The first embodiment of the present invention is a manufacturing process for floor and wall coverings. The process blends a two part epoxy and aggregate material into a mold that once cured, produces a relatively light weight, reinforced, adhereable floor and wall covering. The mold may, if desired, be any selected geometric shape. The selected geometric shape may, if desired, be repeated throughout the mold i.e., a single mold may contain a plurality of the same or different geometric shapes or cavities.

The process begins by blending a selected volume of aggregate material and a selected volume of mixed two part epoxy. A selected first volume of the blended mixture is poured into the mold. A pre-sized first interlocking screening material is placed over each geometrically shaped section of the mold. The mold and its contents are semi-cured for a selected time period. During the semi-curing the mold may, if desired, be vibrated to fill any voids that may have occurred in the pouring of the first blended mixture. A second selected volume of the blended mixture is poured over the first interlocking screening material. A second pre-sized interlocking screening material is positioned over each geometrically shaped section of the mold. The second interlocking screening material is embedded into the second poured volume of blended mixture. The mold may, if desired, be vibrated to fill any voids that may occur in the pouring of the second blended mixture. A layer of adhering material is embedded into each exposed geometric shape of the mold. The mold and its contents are now cured for a selected time period according to the epoxy manufacturer recommendations. After curing, the individual geometric shapes are removed from the mold and are ready to be attached to any surface.

The second embodiment of the present invention is a product produced from the above process. The product is a selected geometric shape with a bottom surface that is readily adhereable to any surface. The geometric shape is reinforced with two layers of interlocking screening material disposed at selected intervals throughout the epoxy. The top surface of the geometric shape may, if desired, be finished with matte, clear, or colored finishes. If desired a thin coat of the same or different epoxy used in the molding process may be applied to the top surface. The top surface may now be polished to the desired sheen.

When taken in conjunction with the accompanying drawings and the appended claims, other features and advantages of the present invention become apparent upon reading the following detailed description of embodiments of the invention.

BRIEF DESCRIPTION OF THE DRAWINGS

The invention is illustrated in the drawings in which like reference characters designate the same or similar parts throughout the figures of which:

FIG. 2 illustrates a perspective view diagram of a mold, FIG. 3 illustrates a side view diagram of the mold of FIG. 2.

DETAILED DESCRIPTION OF THE PRESENT INVENTION

Figure 1:
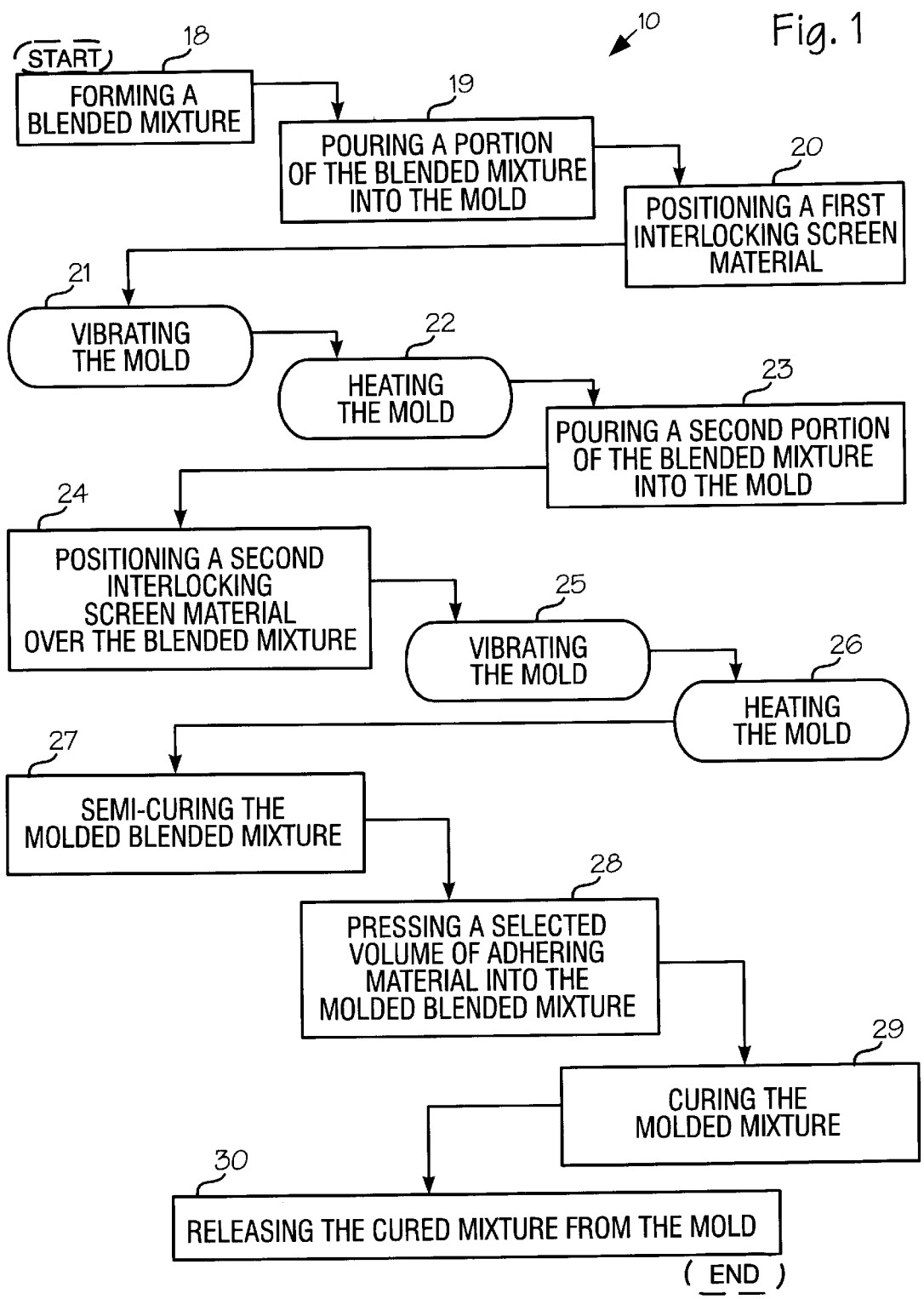
FIG. 1 illustrates a block diagram of the process flow of the first embodiment of the present invention.

Before describing in detail the particular improved process and product for manufacturing floor or wall coverings in accordance with the present invention, it should be observed that the invention resides primarily in the novel manufacturing processes and the novel structural combination of conventional floor and wall covering components and not in the detailed combination of conventional manufacturing apparatus. Accordingly, the process and product for manufacturing floor or wall coverings of the present invention has, for the most part, been illustrated in the drawings by readily understandable schematic diagrams. The drawings show only those specific details that are pertinent to the present invention in order not to obscure the disclosure with structural details which will be readily apparent to those skilled in the art of vacuum form molding, manufacturing of floor and wall coverings, and having the benefit of the description herein. For example a mold 17, FIG. 2 is formed from selected geometric shapes. The selected geometric shape may, if desired, have any height, width, or depth that satisfies the desire for a particular wall or floor covering. Various portions of the mold 17 and the molding process have been simplified in order to emphasize those portions that are most pertinent to the invention. Thus, block diagrams and flow chart illustrations of the figures do not necessarily represent the mechanical structural arrangement of the exemplary system, but are primarily intended to illustrate the novel manufacturing processes and the novel structural combination of conventional floor and wall covering components whereby the present invention may be readily understood

A MORE DETAILED DISCUSSION OF THE PRESENT INVENTION

The First Embodiment

The present invention 10, FIG. 1 is a process or method of manufacturing epoxy based floor and wall coverings, or tiles. The suitable mold 17, FIG. 2 is fabricated using any desirable or convenient geometric shapes (as discussed above). A two part epoxy is selected. Any convenient two part epoxy may be used. An example of a typical two part epoxy is Selbatwede manufactured by Harris Specialty Chemicals, Inc. The two part epoxy consists of two parts by volume of resin to one part by volume of curing agent. The two part epoxy may, if desired, be of any color such as red, green, blue, black, or any mixture of known colors. The selected epoxy may also contain anti-microbial additives that when added to the mixture generally suppress E-Coli, Salmonella, Bacteria, or Fungi from growing on the finished product. The actual volume of the selected epoxy is dependent on the number or size of finished tiles desired or the availability of molds. For example if ten square feet of finished tiles were desired, one gallon of the two part epoxy would be selected.

A selected volume of aggregate material is prepared. The aggregate material may, if desired, be the same or different color as the epoxy. A typical example of aggregate material is Colorquarte manufactured by 3M, Inc. The volume of aggregate material is determined by the volume of epoxy that is to be used in the present invention 10. Generally, the volume of aggregate material is equal to ½ to 1½ the volume of epoxy. Preferably, the volume of aggregate material is equal to the volume of epoxy. For example, if the selected volume of epoxy is equal to one gallon then the aggregate material volume would also equal one gallon.

The process begins by forming a blended mixture 18, FIG. 1 of the selected two part epoxy, as discussed above, in a mixing vessel at room temperature. The temperature of the blending of the mixture is in the range of 50° degrees Fahrenheit (F) to about 105° F. Preferably, the temperature is about 72° F. or room temperature. The mixing time for the blended mixture 18 is in the range of 1 to 60 minutes depending on the room temperature. Preferably, the mixing time of the blended mixture is about 20 minutes. The selected volume of aggregate material is poured into the mixing vessel along with the mixed two part epoxy. The blended mixture 18 is again mixed until the aggregate material is homogeneous with the epoxy.

A selected portion 19 of the blended mixture 18 is poured into each cavity of the mold 17. The actual amount of the blended mixture 18 that is poured into each cavity is dependent on the desired final thickness of the tile. In general, the amount that is poured into each cavity of the mold 17 is in the range of ¼ to ¾ the desired final thickness of the tile. Preferably, the amount that is poured into each cavity of the mold 17 is ½ of the desired final thickness of the tile. For example, if the final thickness of the tile is one inch then the selected volume of blended mixture 18 would equal ½ of the volume of each cavity of the mold 17.

A selected size of an interlocking screening material is placed over each cavity of the mold 17. The interlocking screening material is positioned in such a way as to be contiguous with the top surface of the poured mixture 19. The interlocking material is sized to fit any selected cavity of the mold 17. The interlocking screening material or mesh is fabricated from any convenient material that is flexible, porous, and impervious to epoxy. An example of the interlocking screening material or mesh used in conjunction with the present invention 10 is Fiberglass Screening manufactured by Phifer Wire Products, Inc.

The mold 17 may, if desired, be vibrated 21 by hand or by mechanical means thereby allowing voids naturally forming in the poured mixture to settle and any air bubbles to rise to the surface and dissipate into the atmosphere or into a closed air filtered environment. The vibration is generally in the range of ½ Hertz to about 30 Hertz over a time period of 1 to 10 minutes. Preferable, the vibration is 5 Hertz at room temperature for about 3 to 5 minutes. If desired the mold may be heated 22 to force air trapped in the mixture to the surface and vent into the atmosphere or into a closed air filtered environment. The heat applied is not sufficient to cure the epoxy.

A second selected volume of the blended mixture 18 is now poured 23 into each cavity of the mold 17. The second selected volume of the poured mixture 18 may, if desired, be equal to the first selected poured volume. A second sized section of interlocking screen material is positioned 24 over the surface of each cavity of the mold 17. The second interlocking screen material may, if desired, be the same or different size as the first interlocking screen. The mold 17 is again vibrated 25 and again heated 26 if desired. The second vibrating and heating may, if desired, be at the same Hertz level, temperature, and time period as the first Hertz level, temperature, and time period.

The epoxy filled mold 17 is now allowed to semi-cure for a selected time period. The semi-curing of the epoxy filled mold 17 varies according to temperature and humidity. If the epoxy manufacturer recommended curing time to be based on room temperature at fifty one percent humidity then one half of that time would equal a semi-cured state for the epoxy filled mold 17. After the epoxy filled mold 17 is semi-cured a selected volume of adhering material 28 is poured over the mold 7. The adhering material may be of any material that enables the product to be easily attached to a floor or wall surface. Examples of adhering materials are Portland cement and brick sand mixed in equal portions. The adhering material is pressed or embedded into the epoxy by any convenient means such as a spoon shaped device. The adhering material is integrated or worked into the epoxy. Any excess adhering material is removed and the epoxy filled mold 17 is now ready for final curing 29.

The final curing 29 of the epoxy filled mold 17 may, if desired, be conducted at room temperature. The final curing 29 may also be in the temperature range of 60 to 350 degrees F. at a humidity of about 20% to 90% for 12 to 36 hours. Preferably, the final curing 29 is conducted at 80° F. with 51% humidity for 24 hours.

The finished product is then released 30 from the mold 17 and is now ready for the final surface finish. If desired, a matt finish i.e., uncoated or natural finish may be preserved on the product's top surface. The top surface may also be transformed into a smooth glistening surface by sanding and applying a selected coat of clear epoxy. Subsequent layers of clear epoxy may, if desired, be added to increase the depth of the sheen on the top surface. The selected coat may be a different epoxy mixture or the same as the finished product.

The Second Embodiment

The second embodiment of the present invention 10 is a selected geometrically shaped product produced from the above discussed process. As discussed above and delineated herein, the selected geometrically shaped product may, if desired, be of any shape such as rectangle, oval, or round. The selected geometrically shaped product produced from the mold 17 has a first layer of proportionally mixed epoxy aggregate material and a second layer of proportionally mixed epoxy aggregate material. A first interlocking screening material is disposed medially between the first and second layers of epoxy aggregate material. A second interlocking screening material is disposed on the surface of the second layer of the proportionally mixed epoxy. An adhering material is disposed on the second interlocking screening material. The selected geometrically shaped product is cured at a selected temperature for a selected time period. After curing, the product produced by the above discussed process is an aggregate material filled, reinforced, and readily adhereable floor or wall covering.

The mold 17 may, if desired, be fabricated from any selected geometric shape. For example the selected geometric shape is a rectangle (not shown) that has height, width, and depth. To implement the rectangle as a vacuum form mold a substantially rectangular block of wood is selected. The wood block may, if desired, be oak, poplar, birch, pine or any other type of wood. Preferably, poplar wood is used because poplar does not have a pronounced grain structure as do other types of wood. Once a flexible vacuum formable material 11 is formed about the wood block any raised grain appears as grain impressions in the forming material 11. The wood block is planed, sanded, and finished to the desired dimension. For the reasons of economies of scale a plurality of finished wood blocks may be fabricated. The wood blocks are then sealed with any convenient wood sealer and the surfaces of each wood block are waxed and buffed to produce a smooth surface finish. The wood blocks are then arranged in a suitable pattern for vacuum forming. The flexible vacuum formable material 11 is prepared for molding by coating one side of the material with a mold release solution. The flexible vacuum formable material 11 is then placed over the pattern of wood blocks. The flexible vacuum formable material 11 may be acrylic, polypropylene, or polyethylene in composition. The combination of flexible vacuum formable material 11 and wood blocks are placed in a standard vacuum forming oven and cured according to the oven manufacturers recommendations. After the flexible vacuum formable material 11 is formed about the plurality of wooden blocks the mold 17 is formed. The wooden blocks are removed or released from the material by twisting the mold 17. The mold 17 is a typical mold having mold rows 12, 13, 14, 15, and 16 representing the plurality of wooden blocks used to form the mold. The mold 17 after curing retains the shape of the wooden blocks used in forming the mold, FIG. 2. The vacuum forming machine (not shown) and other discrete manufacturing tools, components, and associated control of the aforementioned tools and components are used to facilitate and control the manufacturing process of the present invention 10.

Figure 4:
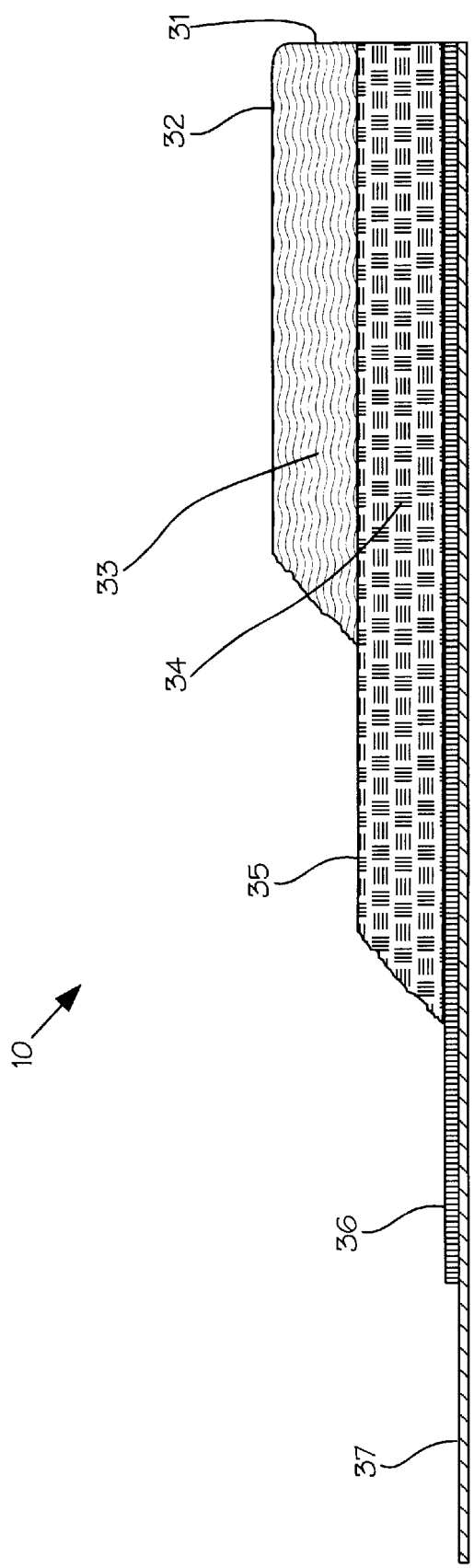
FIG. 4 illustrates a sectional side view diagram of the second embodiment of the present invention.

The resultant or composite product 31 produced from the manufacturing process of the present invention 10 is illustrated in a cross sectional view, FIG. 4. The product 31 represents only one tile that was removed or released from the mold 17. Other products formed by present invention 10 may, if desired, receive separate finishes to their respective surfaces. The product 31 has a first layer 33 comprised of the first volume of the blended mixture 18. The first layer 33 has a top surface 32 that may, if desired, be finished to any convenient texture or surface polish. The product 31 has a second layer 34 comprised of the second volume of the blended mixture 18. A first sized piece of interlocking screening material 35 is medially disposed between the first layer 33 and the second layer 34. The first interlocking screening material is embedded into layers 33 and 34. The tile 31 has an adhering layer 37 that comprises the adhering material (discussed above). A second sized interlocking screening material 36 is medially disposed between the second layer 34 and the adhering layer 37. The second interlocking screening material 36 is embedded into the second layer 35 and the adhering layer 37.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims, means-plus-function clause is intended to cover the structures described herein as performing the recited function and not only structural equivalents but also equivalent structures. Thus, although a nail and a screw may not be structural equivalents in that a nail employs a cylindrical surface to secure wooden parts together whereas a screw employs a helical surface, in the environment of fastening wooden parts, a nail and a screw may be equivalent structures.

I claim:

1. A process of manufacturing floor or wall coverings in a provided vessel from provided aggregate material, comprising the steps of:
   a) providing a mold of selected geometry;
   b) blending selected volumes consisting of a mixture of a two-part epoxy and the aggregate material in the vessel;
   c) pouring and molding a first selected volume of said blended mixture into said mold;
   d) positioning a provided first interlocking screening material over said first selected volume of said blended molded mixture;

e) embedding an adhering material into the top surface of said first selected volume of said blended molded mixture by pressing the adhering material into said first selected volume;

f) curing said molded mixture; and g) releasing said cured mixture from said mold.

2. A process of manufacturing floor or wall coverings as recited in claim 1 further comprising between steps (d) and (e) the step of:

i) semi-curing said molded first volume of said blended mixture.

3. A process of manufacturing floor or wall coverings as recited in claim 1 further comprising between steps (d) and (e) the steps of:

k) vibrating said mold for a first selected time period; and l) heating said mold at a first selected temperature.

4. A process of manufacturing as recited in claim 3 wherein said mold is fabricated from material selected from the group consisting of wood, steel, aluminum, and polymer based material.

5. A process of manufacturing as recited in claim 4 wherein said mold's geometry is selected from the group consisting of round, square, triangular, and oval shapes.

6. A process of manufacturing as recited in claim 5 wherein said mold's geometry is rectangular.

7. A process of manufacturing as recited in claim 6 wherein the volume of aggregate material in said blended mixture is equal to ½ to 1½ times the volume of the two-part epoxy in said blended mixture.

8. A process of manufacturing as recited in claim 6 wherein the volume of aggregate material in said blended mixture is equal to the volume of the two-part epoxy in said blended mixture.

9. A process of manufacturing as recited in claim 8 wherein said first selected time period is in the range of 1 to 60 minutes.

10. A process of manufacturing as recited in claim 9 wherein said first selected time period is 20 minutes.

11. A process of manufacturing as recited in claim 10 wherein said first selected temperature is in the range of 50° to 105° Fahrenheit.

12. A process of manufacturing as recited in claim 11 wherein said first selected temperature is ambient temperature.

13. A process of manufacturing as recited in claim 12 wherein said first selected temperature is 72° Fahrenheit.

14. A process of manufacturing as recited in claim 13 wherein said first poured selected volume of said blended mixture is equal to ¼ to ¾ of said cured mixture volume.

15. A process of manufacturing floor or wall coverings in a provided vessel from provided aggregate material, comprising the steps of:

a) providing a mold of selected geometry;

b) blending selected volumes consisting of a mixture of a two-part epoxy and the aggregate material in the vessel;

c) pouring and molding a first selected volume of said blended mixture into said mold;

d) positioning a provided first interlocking screening material over said first selected volume of said blended molded mixture;

e) embedding said first interlocking screening material into said first selected volume of said blended molded mixture;

pouring and molding a second selected volume of said blended mixture over said embedded first interlocking screening material;

g) embedding a second interlocking screening material into said second selected volume of said blended molded mixture;

h) embedding an adhering material into the top surface of said second selected volume of said blended molded mixture by pressing the adhering material ino said second selected volume thereby integrating said adhering material into the top surface of said second selected volume of said blended molded mixture;

i) curing said molded mixture; and j) releasing said cured mixture from said mold.

16. A process of manufacturing as recited in claim 15 wherein said second poured selected volume of said blended mixture is equal to said first poured selected volume of said blended mixture.

* * * * *